(12) United States Patent
Suzuki et al.

(10) Patent No.: US 12,334,121 B2
(45) Date of Patent: Jun. 17, 2025

(54) DISK DEVICE SUSPENSION ASSEMBLY WITH MICROACTUATOR GROUNDING CONFIGURATION

(71) Applicants: Kabushiki Kaisha Toshiba, Tokyo (JP); Toshiba Electronic Devices & Storage Corporation, Tokyo (JP)

(72) Inventors: Yasuo Suzuki, Fujisawa Kanagawa (JP); Takuma Kido, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/116,642

(22) Filed: Mar. 2, 2023

(65) Prior Publication Data

US 2024/0096379 A1 Mar. 21, 2024

(30) Foreign Application Priority Data

Sep. 16, 2022 (JP) .................................. 2022-148080

(51) Int. Cl.
*G11B 33/14* (2006.01)
*G11B 5/48* (2006.01)

(52) U.S. Cl.
CPC .......... *G11B 33/1493* (2013.01); *G11B 5/483* (2015.09); *G11B 5/484* (2013.01); *G11B 5/4846* (2013.01); *G11B 5/4853* (2013.01); *G11B 5/486* (2013.01)

(58) Field of Classification Search
None
See application file for complete search history.

(56) References Cited

U.S. PATENT DOCUMENTS

| 6,950,288 B2 | 9/2005 | Yao et al. | |
|---|---|---|---|
| 6,987,649 B2 | 1/2006 | Nakagawa | |
| 7,161,765 B2 | 1/2007 | Ichikawa et al. | |
| 2014/0160599 A1* | 6/2014 | Higuchi et al. | G11B 5/486 360/294.4 |
| 2016/0336031 A1* | 11/2016 | Arai et al. | G11B 5/486 |
| 2020/0265866 A1* | 8/2020 | Suzuki | G11B 5/4873 |
| 2020/0286511 A1* | 9/2020 | Nesori | G11B 5/4873 |
| 2022/0076698 A1* | 3/2022 | Nesori | G11B 5/483 |
| 2023/0029666 A1* | 2/2023 | Suzuki et al. | G11B 5/483 |

* cited by examiner

*Primary Examiner* — Craig A. Renner
(74) *Attorney, Agent, or Firm* — Knobbe Martens Olson & Bear LLP

(57) ABSTRACT

According to one embodiment, a flexure for use in a suspension assembly includes: a supporting plate; a wiring member including a metal plate and a wiring substrate placed on the metal plate and has a tip-side portion placed on the supporting plate, a base end-side portion extending to an outside of the supporting plate, and a first end provided at an extension end of the base end-side portion; and a piezoelectric element mounted on the wiring member. The wiring substrate includes an insulating layer and a conductive layer stacked on the insulating layer, the conductive layer having a plurality of connecting pads including a ground pad to which a ground electrode of the piezoelectric element is connected, a plurality of connecting terminals provided at the first end and including a ground terminal, and a plurality of traces including a ground trace connecting the ground pad and the ground terminal.

8 Claims, 7 Drawing Sheets

DISK DEVICE SUSPENSION ASSEMBLY WITH MICROACTUATOR GROUNDING CONFIGURATION

CROSS-REFERENCE TO RELATED APPLICATION(S)

This application is based upon and claims the benefit of priority from Japanese Patent Application No. 2022-148080, filed Sep. 16, 2022, the entire contents of which are incorporated herein by reference.

FIELD

Embodiments described herein relate generally to a suspension assembly and a disk device including the suspension assembly.

BACKGROUND

As a disk device, a hard disk drive (HDD), for example, includes a plurality of magnetic disks rotatably provided in a housing in a prescribed manner, a plurality of magnetic heads that read and write information from and into the magnetic disks, and a head actuator that supports the magnetic heads in such a way that the magnetic heads can move with respect to the magnetic disks.

The head actuator has a plurality of suspension assemblies (which are sometimes referred to as gimbal assemblies), each supporting the magnetic head at a tip portion thereof. The suspension assembly includes a suspension made of a metal supporting plate and a flexure (i.e., a wiring member) provided on the suspension. The flexure has a displaceable gimbal portion and the magnetic head is mounted on this gimbal portion. Moreover, a piezoelectric element which is also called a piezo element is mounted on the flexure and constitutes a micro actuator.

Examples of related art include US6,987,649B, US6,950,288B, and US7,161,765B.

SUMMARY

In some embodiments, a flexure for use in a suspension assembly comprises a metal plate. In certain embodiments, the flexure further comprises a wiring substrate connected to the metal plate. In further embodiments, the wiring substrate comprises an insulating layer, the insulating layer abutting the metal plate. In certain embodiments, the wiring substrate of the flexure further comprises a conductive layer disposed on the insulating layer. In some embodiments, the conductive layer comprises a ground pad and a piezoelectric element. In certain embodiments, the piezoelectric element comprises a ground electrode connected to the ground pad.

In further embodiments, the ground electrode of the piezoelectric element is connected to the ground pad of the conductive layer of the wiring substrate via an adhesive material.

In certain embodiments, the flexure for use in a suspension assembly comprises a first end. In some embodiments, the first end of the flexure comprises a plurality of connecting terminals. In further embodiments, one of the plurality of connecting terminals of the first end of the flexure is a ground terminal. In certain embodiments, the conductive layer of the wiring substrate further comprises a ground trace. In some embodiments, the ground trace connects the ground terminal and the ground pad of the conductive layer.

In some embodiments, the ground trace is cut into a first part and a second part. In certain embodiments, the first part and the second part of the ground trace electrically connect to each other. In further embodiments, the first part and the second part of the ground trace electrically connect to each other via a junction conductor. In certain embodiments, the junction conductor that electrically connects the first part and the second part of the ground trace is formed of a material the electrical resistance of which is higher than an electrical resistance of the ground trace.

In yet further embodiments, the junction conductor that electrically connects the first part and the second part of the ground trace is integrally formed with a part of the metal plate of the flexure.

In certain embodiments, the junction conductor that electrically connects the first part and the second part of the ground trace comprises conductive paste provided on the wiring substrate.

In further embodiments, the ground terminal of the first end of the flexure is the connecting terminal of the plurality of connecting terminals that is located farthest from a head of the flexure.

In certain embodiments, a disk device comprises a disk-shaped recording medium, the disk-shaped recording medium having a recording layer. In further embodiments, the disk device further comprises a head actuator, the head actuator including a flexure for use in a suspension assembly. In some embodiments, the flexure of the head actuator comprises a metal plate and a wiring substrate connected to the metal plate. In further embodiments, the wiring substrate of the flexure comprises an insulating layer, the insulating layer abutting the metal plate. In certain embodiments, the wiring substrate of the flexure further comprises a conductive layer disposed on the insulating layer. In some embodiments, the conductive layer comprises a ground pad and a piezoelectric element. In certain embodiments, the piezoelectric element comprises a ground electrode connected to the ground pad. In further embodiments, the ground electrode of the piezoelectric element is connected to the ground pad of the conductive layer of the wiring substrate via an adhesive material. In certain embodiments, the flexure for use in a suspension assembly comprises a first end. In some embodiments, the first end of the flexure comprises a plurality of connecting terminals.

In certain embodiments, the head actuator of the disk device includes a pivotally supported actuator block. In some embodiments, the head actuator of the disk device further comprises a plurality of arms extending from the actuator block. In further embodiments, the head actuator of the disk device further comprises the suspension assembly attached to the arm. In certain embodiments, the disk device further comprises a board unit that includes a joint portion attached to the actuator block. In further embodiments, the joint portion attached to the actuator block includes a plurality of connecting pads. In further embodiments, the plurality of connecting pads of the joint portion are connected to the plurality of connecting terminals provided at the first end of the flexure.

DETAILED DESCRIPTION

In general, a lift tab is provided at the tip of a suspension in such a way as to protrude therefrom. The lift tab is driven onto a ramp, whereby a magnetic head is held in an unloaded position. At the time of loading/unloading of the magnetic head, the lift tab moves while rubbing on the ramp. This sometimes causes static electricity (ESD) to be generated in the lift tab. The generated static electricity is applied to a piezoelectric element via a metal plate of a flexure, which might have an adverse effect on the piezoelectric element.

Embodiments provide a flexure for use in a suspension assembly and a disk device that can reduce the effect of static electricity on a piezoelectric element and improve the reliability.

In general, according to one embodiment, a suspension assembly includes a flexure, the flexure comprising: a supporting plate having a tip portion and a base end portion; a wiring member that includes a metal plate and a wiring substrate placed on the metal plate and has a tip-side portion placed on the supporting plate, a base end-side portion extending from the base end portion to an outside of the supporting plate, and a first end provided at an extension end of the base end-side portion; a head placed on the wiring member; and a piezoelectric element that has a ground electrode and is mounted on the wiring member. The wiring substrate includes: a first insulating layer that abuts the metal plate; and a conductive layer stacked on the first insulating layer and has a plurality of connecting pads including a ground pad to which the ground electrode is connected, a plurality of connecting terminals provided at the first end and including a ground terminal, and a plurality of traces including a ground trace connecting the ground pad and the ground terminal.

Hereinafter, a disk device according to an embodiment will be described with reference to the drawings.

It is to be noted that the disclosure is merely an example and any appropriate changes and modifications which are easily conceivable and made by a person skilled in the art without departing from the spirit of the disclosure fall within the scope of the disclosure. Moreover, the drawings sometimes show the sizes, shapes and the like of portions schematically as compared to their actual sizes, shapes and the like in order to make explanations clearer; these sizes, shapes and the like are presented by way of example only and are not intended to limit the interpretation of the disclosure. Furthermore, in the specification and drawings, elements which are similar to those described in connection with the already explained drawings are denoted by the same reference signs and detailed explanations thereof are sometimes omitted as appropriate.

First Embodiment

As a disk device, a hard disk drive (HDD) according to a first embodiment will be described in detail.

Figure 1:
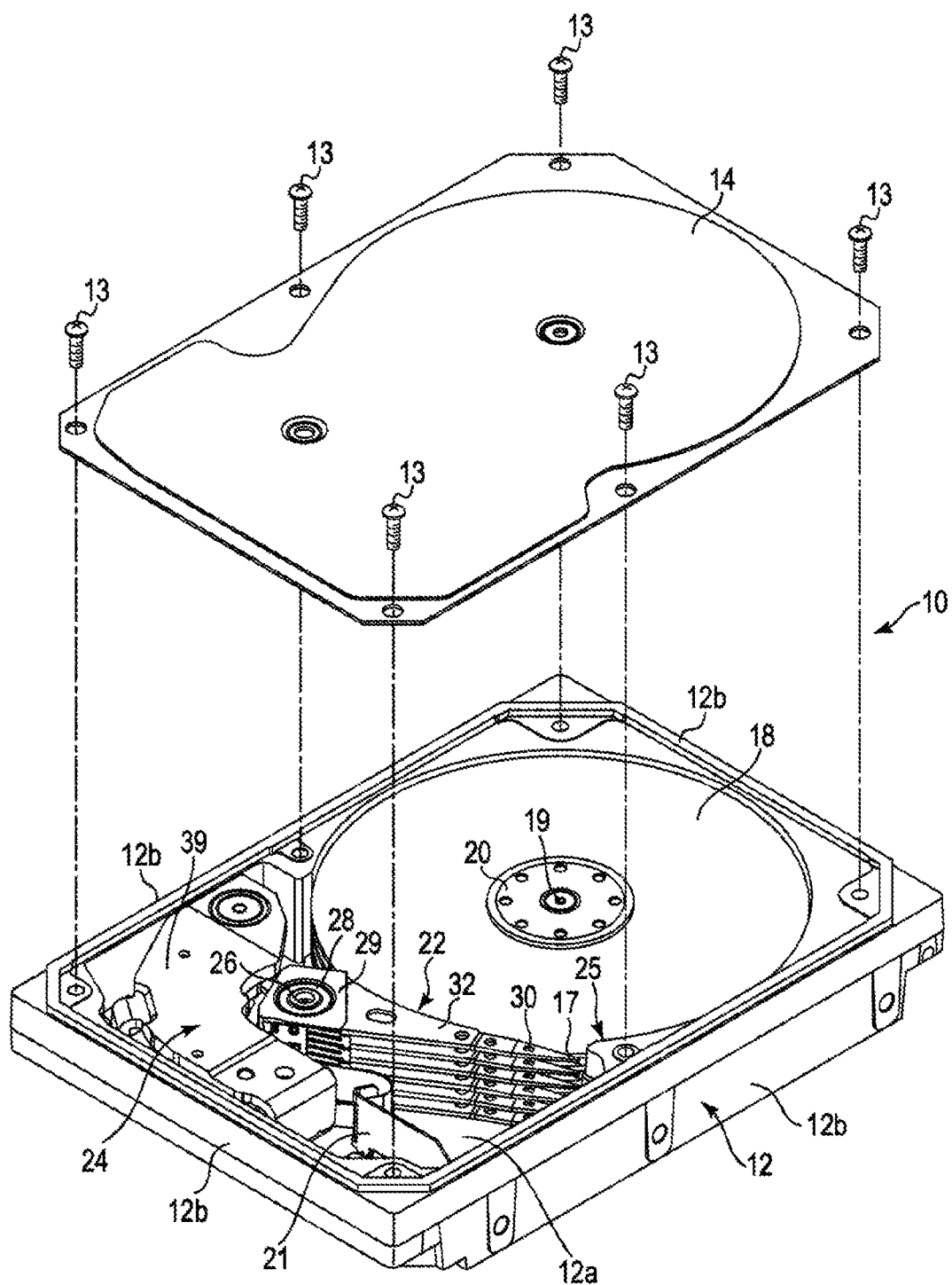
FIG. 1 is a perspective view showing a hard disk drive (HDD) according to an embodiment.

FIG. 1 is a perspective view of the HDD according to the first embodiment with a top cover detached therefrom.

As shown in FIG. 1, the HDD includes a rectangular housing 10. The housing 10 includes: a base 12 in the shape of a rectangular box with an opening in the top face thereof; and a top cover 14. The base 12 has a rectangular bottom wall 12a and a plurality of side walls 12b standing along the outer edge of the bottom wall 12a and is formed in one piece of aluminum, for example. The top cover 14 is formed of stainless steel, for example, in the shape of a rectangular plate. The top cover 14 is secured to the upper sides of the side walls 12b of the base 12 with a plurality of screws 13 and closes the upper opening of the base 12.

A plurality of magnetic disks 18 as disk-shaped recording media and a spindle motor 19 that supports and rotates the magnetic disks 18 are provided in the housing 10. The spindle motor 19 is provided on the bottom wall 12a in a prescribed manner. Each magnetic disk 18 is formed in the shape of a circular disk having a diameter of 96 mm (3.5 inches), for example, and has a substrate made of a non-magnetic material, for example, glass or aluminum and a magnetic recording layer formed on the upper surface and/or lower face of the substrate. The magnetic disks 18 are coaxially fitted onto an unillustrated hub of the spindle motor 19 and clamped by a clamping spring 20. As a result, the magnetic disks 18 are supported in a state in which they are located parallel to the bottom wall 12a of the base 12. The plurality of magnetic disks 18 are rotated by the spindle motor 19 at predetermined rpm.

In the present embodiment, five magnetic disks 18, for example, are placed in the housing 10; the number of magnetic disks 18 is not limited to five and four or less or six or more magnetic disks 18 may be placed therein.

A plurality of magnetic heads 17 that write and read information into and from the magnetic disks 18 and an actuator assembly 22 that movably supports these magnetic heads 17 with respect to the magnetic disks 18 are provided in the housing 10. Moreover, a voice coil motor (VCM) 24 that pivots and positions the actuator assembly 22, a ramp loading mechanism 25 that holds the magnetic heads 17 in unloaded positions separated from the magnetic disks 18 when the magnetic heads 17 move to the outermost edges of the magnetic disks 18, and a board unit (an FPC unit) 21 on which electronic components such as a conversion connector are mounted are provided in the housing 10. The actuator assembly 22 and the VCM 24 constitute a head actuator. The ramp loading mechanism 25 includes a ramp provided in the base 12 and a lift tab provided in the actuator assembly 22.

The actuator assembly 22 includes a pivotally supported actuator block 29, a plurality of arms 32 extending from the actuator block 29, and a suspension assembly 30 extending from each arm 32. The magnetic head 17 is supported at a tip portion of each suspension assembly 30. The magnetic head 17 includes a read head, a write head, an assist element, a heater and so forth. The suspension assembly 30 is an assembly including the magnetic head 17 and is sometimes referred to as a head suspension assembly.

An unillustrated printed circuit board is secured to the outer surface of the bottom wall 12a of the base 12 with screws. The printed circuit board constitutes a control portion that controls an operation of the spindle motor 19 and an operation of the VCM 24 and the magnetic heads 17 via the board unit 21.

Figure 2:
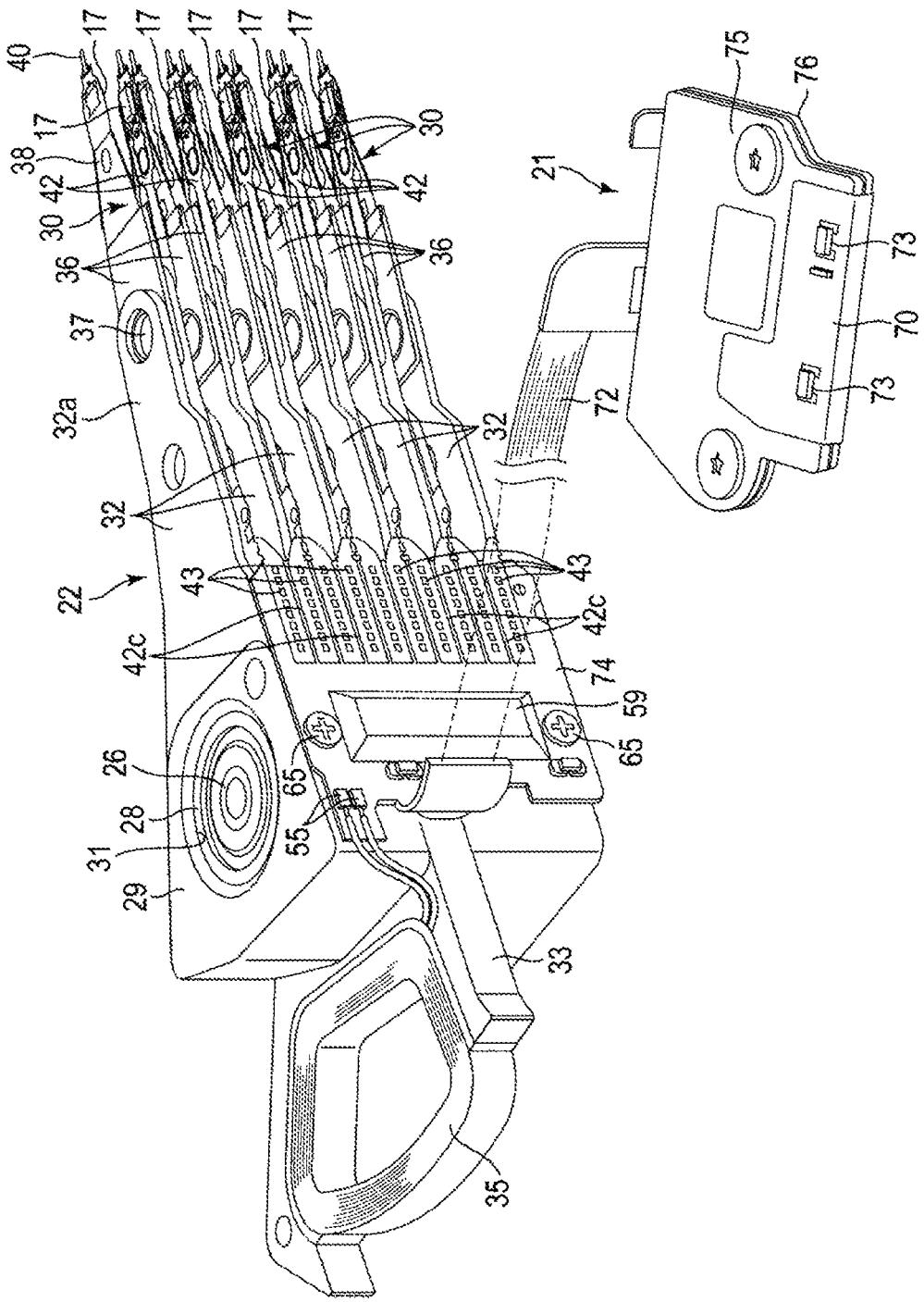
FIG. 2 is a perspective view showing an actuator assembly of the HDD.

FIG. 2 is a perspective view showing the actuator assembly 22 and the FPC unit 21. As shown in FIG. 2, the actuator assembly 22 includes the actuator block 29 having a through hole 31, a bearing unit (a unit bearing) 28 provided in the through hole 31, a plurality of, for example, six arms 32 extending from the actuator block 29, and ten suspension assemblies 30 attached to the arms 32. A supporting shaft (a pivot) 26 is provided on the bottom wall 12a so as to stand thereon. The actuator block 29 is pivotally supported about the supporting shaft 26 by the bearing unit 28.

In the present embodiment, the actuator block 29 and the six arms 32 are formed in one piece of aluminum or the like and constitute what is called an E block. Each arm 32 is formed in the shape of a long and narrow flat plate, for example, and extends from the actuator block 29 in a direction that is at right angles to the supporting shaft 26. The six arms 32 are provided parallel to one another with a clearance left therebetween.

The actuator assembly 22 includes a supporting frame 33 extending from the actuator block 29 in a direction opposite to the arms 32, and a voice coil 35 is supported by this supporting frame 33. As shown in FIG. 1, the voice coil 35 is located between a pair of yokes 39, of which one is fixed on the base 12. The voice coil 35 constitutes the VCM 24 with these yokes 39 and a magnet fixed to any one of the yokes 39.

As shown in FIG. 2, the ten suspension assemblies 30 are attached to tip portions 32a of the arms 32. The suspension assemblies 30 include an up head suspension assembly that supports the magnetic head 17 in such a way that the magnetic head 17 faces upward and a down head suspension assembly that supports the magnetic head 17 in such a way that the magnetic head 17 faces downward. The up head suspension assembly is obtained by placing a suspension assembly 30 having a given structure so as to face upward, and the down head suspension assembly is obtained by placing a suspension assembly 30 having the same structure so as to face downward.

The FPC unit 21 includes, as integral parts thereof, a roughly rectangular base portion 70, a junction portion 72 in the shape of a long and narrow band and extending from one side edge of the base portion 70, and a roughly rectangular joint portion (an FPC joint portion) 74 continuously provided at a tip portion of the junction portion 72. The base portion 70, junction portion 72, and joint portion 74 may be formed of a flexible printed circuit (FPC).

Electronic components such as a conversion connector (unillustrated) and a plurality of capacitors 73 are mounted on one (an outer surface) of the surfaces of the base portion 70 and electrically connected to unillustrated traces. Two metal plates 75 and 76 functioning as reinforcing sheets are stuck on the other (an inner surface) of the surfaces of the base portion 70. The base portion 70 is placed on the bottom wall 12a of the housing 10 and secured to the bottom wall 12a with two screws. The conversion connector on the base portion 70 is connected to a control circuit substrate provided on the bottom face side of the housing 10.

Figure 7:
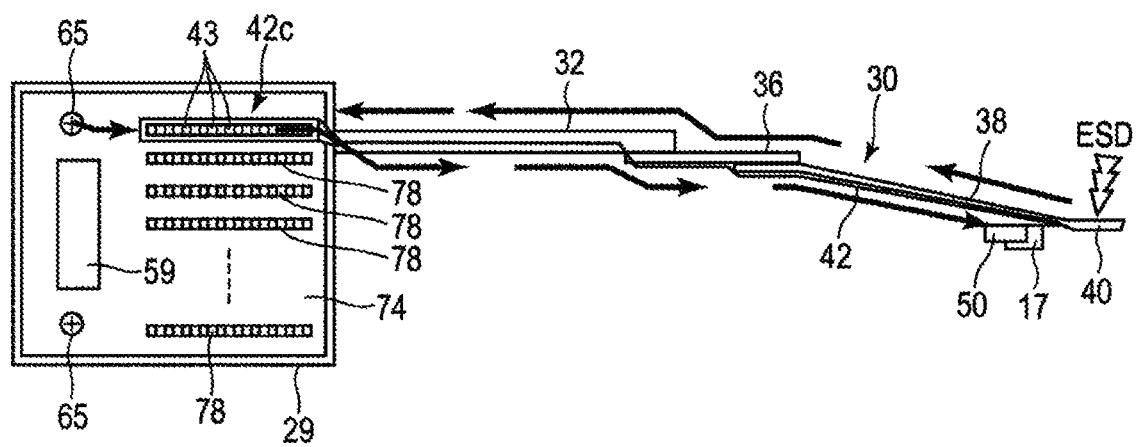
FIG. 7 is a side view schematically showing the actuator assembly including the suspension assembly.

The junction portion 72 extends from the base portion 70 toward the actuator assembly 22. The joint portion 74 provided at an extension end of the junction portion 72 is formed in the shape of a rectangle whose height and width are nearly equal to the height and width of a side face (an installation surface) of the actuator block 29. The joint portion 74 is stuck on the installation surface of the actuator block 29 via a backing plate formed of aluminum or the like and is secured to the installation surface with fastening screws 65. A head IC (a head amplifier) 59 is mounted on the joint portion 74. A pair of connecting pads 55 and a large number of connecting pad groups 78, which will be described later in relation to FIG. 7, are provided in the joint portion 74. The head IC 59 is connected to the connecting pad groups 78 and the base portion 70 via a plurality of unillustrated traces. The voice coil 35 is connected to the connecting pads 55. First ends 42c of flexures 42, which will be described later, are joined to the connecting pad groups 78.

Next, an example of the suspension assembly 30 will be described in detail.

Figure 3:
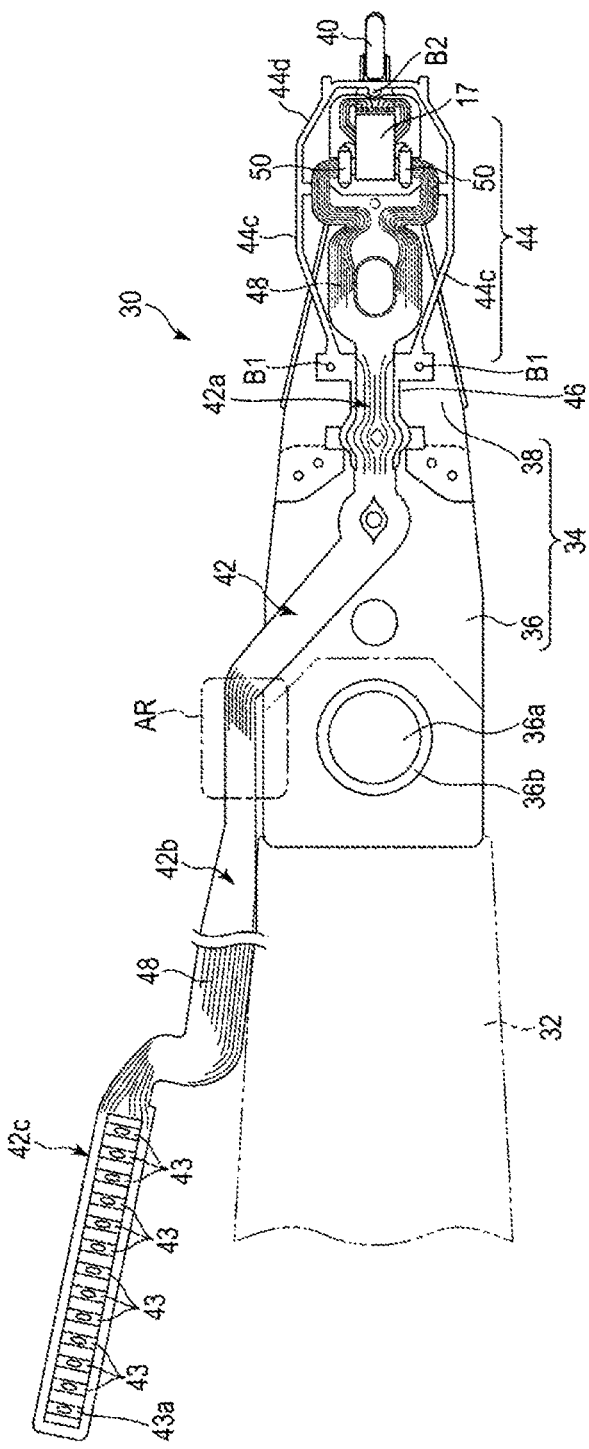
FIG. 3 is a plan view showing one head suspension assembly of the actuator assembly.
Figure 4:
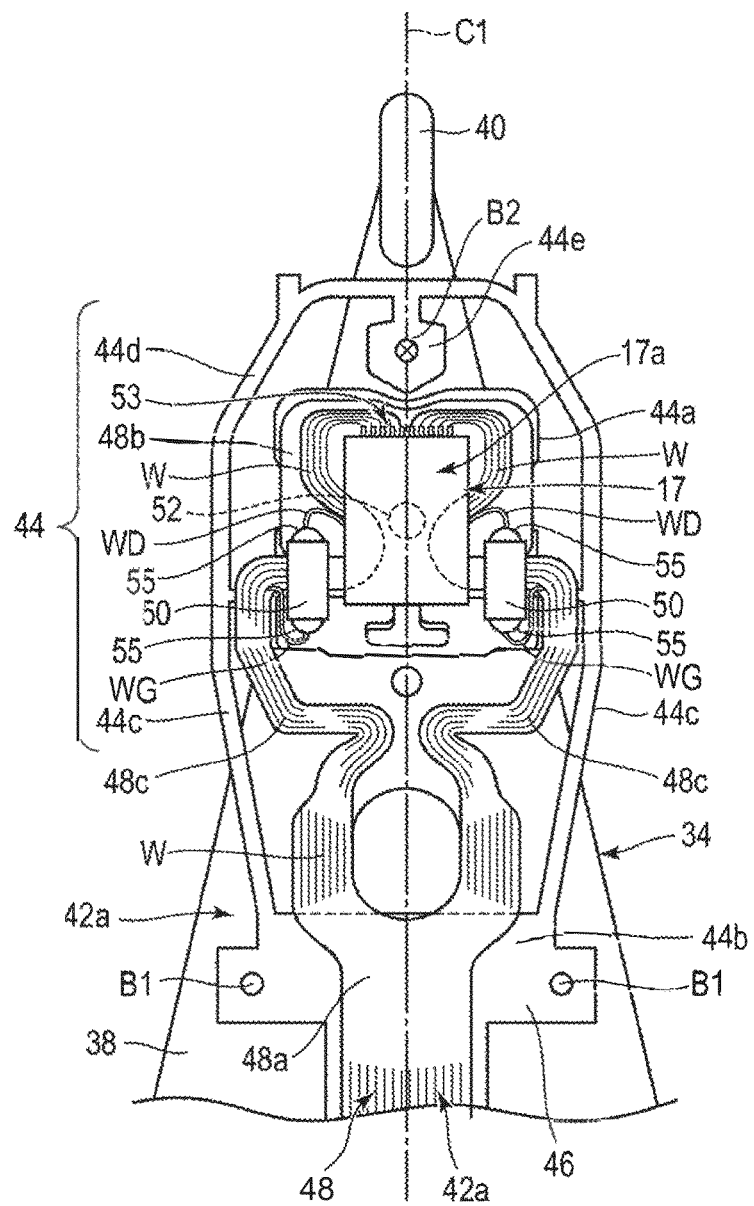
FIG. 4 is a plan view showing an enlarged tip portion of the suspension assembly.

FIG. 3 is a plan view showing the suspension assembly 30 and FIG. 4 is a plan view showing an enlarged tip portion of the suspension assembly 30.

As shown in FIG. 3, the suspension assembly 30 has a suspension 34 extending from the arm 32 and the magnetic head 17 is attached to a tip portion of the suspension 34. The suspension 34 functioning as a supporting plate includes a rectangular base plate 36 made of a metal plate and a load beam 38 that is made of a metal plate and has the shape of a long and narrow flat spring. A base end portion of the load beam 38 is placed in such a way as to overlap a tip portion of the base plate 36 and welded in more than one place, whereby the load beam 38 is fixed to the base plate 36. A tip portion of the load beam 38 constitutes a tip portion of the supporting plate and the base end portion of the load beam 38 and the base plate 36 constitute a base end portion of the supporting plate. The load beam 38 tapers down and has a rod-like lift tab 40 provided at the tip of the load beam 38 in such a way as to protrude therefrom.

The base plate 36 has, in a base end portion thereof, a circular opening 36a and an annular protrusion 36b located around the opening 36a. The protrusion 36b is fitted into a circular caulking hole 37 (see FIG. 2) formed in a caulking seating surface of the arm 32 and is caulked, whereby the base plate 36 is fastened to the tip portion 32a of the arm 32. Alternatively, the base plate 36 may be fixed to the tip portion 32a of the arm 32 by laser welding, spot welding, or bonding.

The suspension assembly 30 includes a long and narrow band-like flexure (i.e., a wiring member) 42 for transmitting a recording signal, a reproducing signal, and a drive signal for a piezoelectric element and a pair of piezoelectric elements (for example, PZT elements) 50 mounted on the flexure 42. The flexure 42 includes a tip-side portion 42a placed on the load beam 38 and the base plate 36, a base end-side portion 42b extending outward from the side edge of the base plate 36 to the actuator block 29 along the side edge of the arm 32, and a first end 42c extending from an extension end of the base end-side portion 42b. The first end 42c has a plurality of connecting terminals (electrode pads) 43 provided side by side. These connecting terminals 43 are electrically joined to connecting terminals of a joint portion provided in the actuator block 29.

The flexure 42 includes: a metal thin plate (i.e., a metal plate) 46 that serves as a base and is made of stainless steel or the like; and a band-like wiring substrate (a flexible printed circuit: FPC) 48 connected to the metal thin plate 46, and is formed as a long and narrow stacked plate. The wiring substrate (FPC) 48 includes a base insulating layer (i.e., a first insulating layer), most of which is fixed to the metal thin plate 46, a conductive layer (a wiring pattern) formed on the base insulating layer, and a cover insulating layer (a second insulating layer) stacked on the base insulating layer and covering the conductive layer. Copper foil, for example, is used as the conductive layer, and a plurality of traces (a signal trace, a driving trace, and a ground trace), a plurality of connecting pads, and a plurality of connecting terminals are formed by patterning this copper foil.

As shown in FIGS. 3 and 4, in the tip-side portion 42a of the flexure 42, the metal thin plate 46 is stuck on the surface of the load beam 38 and the base plate 36 or spot-welded thereto at a plurality of welding points. In one example, the metal thin plate 46 has two welding points (first welded parts) B1 welded to the base end portion of the load beam 38 and one welding point (a second welded part) B2 welded to the tip portion of the load beam 38.

A tip portion of the flexure 42 is located on the tip portion of the load beam 38 and constitutes a gimbal portion 44 functioning as an elastic supporting portion. The magnetic head 17 is placed and fixed on the gimbal portion 44 and supported on the load beam 38 via the gimbal portion 44. The pair of piezoelectric elements 50 constituting a micro actuator is mounted on the gimbal portion 44 and placed on both sides of the magnetic head 17.

As shown in FIG. 4, in the gimbal portion 44, the metal thin plate 46 includes, as integral parts thereof, a roughly rectangular tongue portion (a supporting portion) 44a located on the tip side, a roughly rectangular base end portion (a first end) 44b located on the base-end side with a space between the tongue portion 44a and the base end portion 44b, a pair of elastically deformable outriggers (a link portion) 44c, each connecting the base end portion 44b and the tongue portion 44a, a connecting frame 44d extending from one outrigger 44c to the other outrigger 44c around the tip side of the tongue portion 44a, and a roughly rectangular fixed pad portion (a second end) 44e extending from the connecting frame 44d and facing a tip portion of the tongue portion 44a. The fixed pad portion 44e is located between the connecting frame 44d and the tongue portion 44a.

The base end portion 44b is stuck on the surface of the load beam 38 and spot-welded to the load beam 38 at the welding points B1. The fixed pad portion 44e is spot-welded to the tip portion of the load beam 38 at the welding point B2. The welding point B2 is located on a central axis line Cl of the suspension 34.

A central area of the tongue portion 44a abuts a dimple (a protrusion) 52 provided in the tip portion of the load beam 38 in such a way as to protrude therefrom. The pair of outriggers 44c and the connecting frame 44d are elastically deformed, which allows the tongue portion 44a to be displaced in various directions with the dimple 52 used as a pivot point. This allows the tongue portion 44a and the magnetic head 17 mounted on the tongue portion 44a to be displaced in a roll direction or a pitch direction flexibly following the surface fluctuation of the magnetic disk 18 and to maintain microscopic clearance between the surface of the magnetic disk 18 and the magnetic head 17.

In the gimbal portion 44, the wiring substrate 48 of the flexure 42 is placed on the metal plate 46 and extends from the base end portion 44b to an area above the tongue portion 44a through the space along the central axis line Cl. That is, the wiring substrate 48 includes a base end portion 48a stuck on the base end portion 44b, a tip portion 48b stuck to the tongue portion 44a, and a pair of band-like bridge portions 48c bifurcating and extending from the base end portion 48a to the tip portion 48b. The magnetic head 17 and the piezoelectric elements 50 are mounted on the tip portion 48b.

A plurality of connecting pads (electrode pads) 53 are provided in the tip portion 48b and arranged in a width direction. Moreover, a plurality of connecting pads (electrode pads) 55 for connection of the piezoelectric elements 50 are provided in the tip portion 48b. The wiring substrate 48 includes a plurality of signal traces W extending from the connecting pads 53 toward the base end portion 48a through side edge portions of the tip portion 48b and a plurality of driving traces WD and ground traces WG extending from the connecting pads 55 toward the base end portion 48a. These signal traces W, driving traces WD, and ground traces WG extend throughout almost the entire length of the wiring substrate 48 and connect to the plurality of connecting terminals 43 provided at the first end 42c.

The magnetic head 17 includes a roughly rectangular head slider 17a and unillustrated recording element (a write head), read element (a read head), and assist element (a heater) which are provided in the head slider 17a. The magnetic head 17 is mounted on the tip portion 48b. The recording element (the write head), the read element (the read head), and the assist element (the heater) are electrically connected to the plurality of connecting pads 53 of the tip portion 48b via unillustrated traces, electrodes, and conductive adhesive. As a result, the magnetic head 17 is connected to the signal traces W of the wiring substrate 48 via the connecting pads 53.

As the pair of piezoelectric elements 50, thin-film piezoelectric elements (PZT elements) in the shape of a rectangular plate, for example, are used. The piezoelectric element 50 is not limited to a thin-film type piezoelectric element (having a thickness of about 10 μm), and a bulk type or bulk layered type piezoelectric element (having a thickness of 40 μm or more) may be used. Moreover, the piezoelectric element 50 is not limited to a PZT element and other piezoelectric elements may be used as the piezoelectric element 50. Furthermore, a drive element is not limited to a piezoelectric element and other drive elements that can expand and contract by the application of a current may be used.

The piezoelectric element 50 is placed in such a way that the longitudinal direction (the expansion and contraction direction) thereof is parallel to the central axis line Cl of the suspension 34. The two piezoelectric elements 50 are arranged on the sides of the magnetic head 17 in the width direction thereof in such a way as to be parallel to each other.

Next, the mounting structure of the piezoelectric element 50 will be described in detail.

Figure 5:
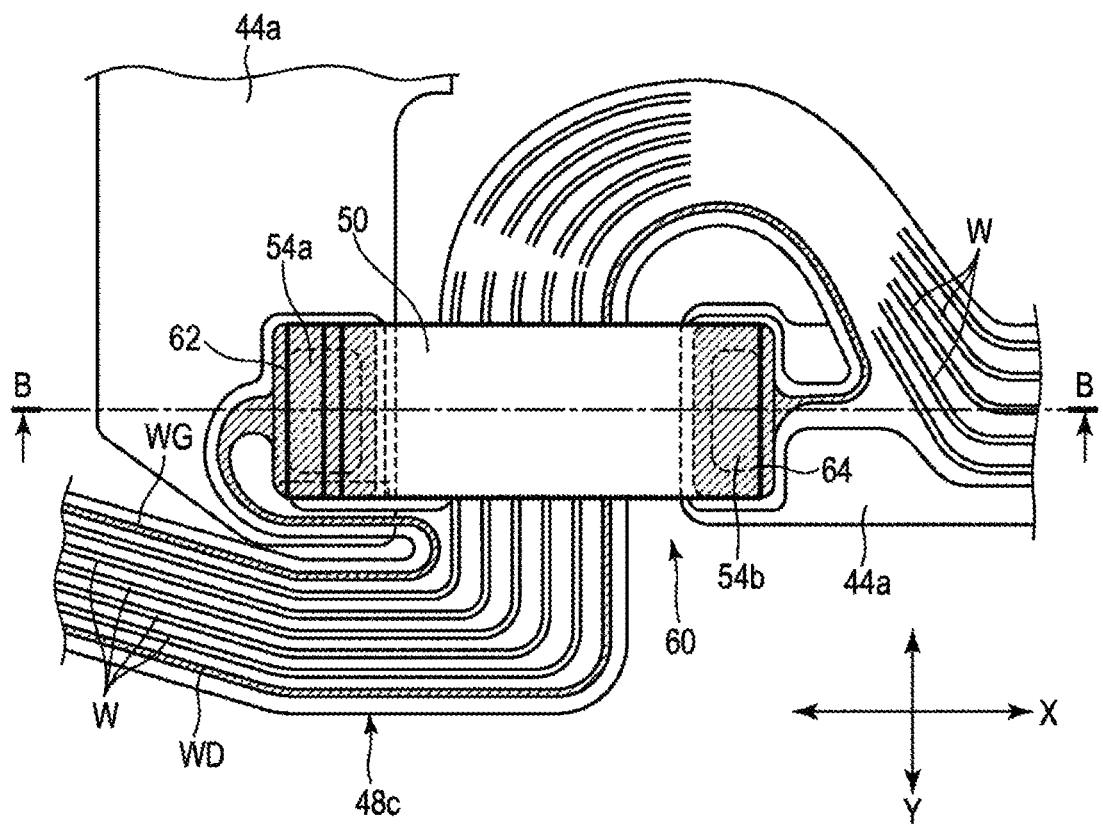
FIG. 5 is a plan view showing a part of a piezoelectric element and a part of a flexure in the suspension assembly.
Figure 6:
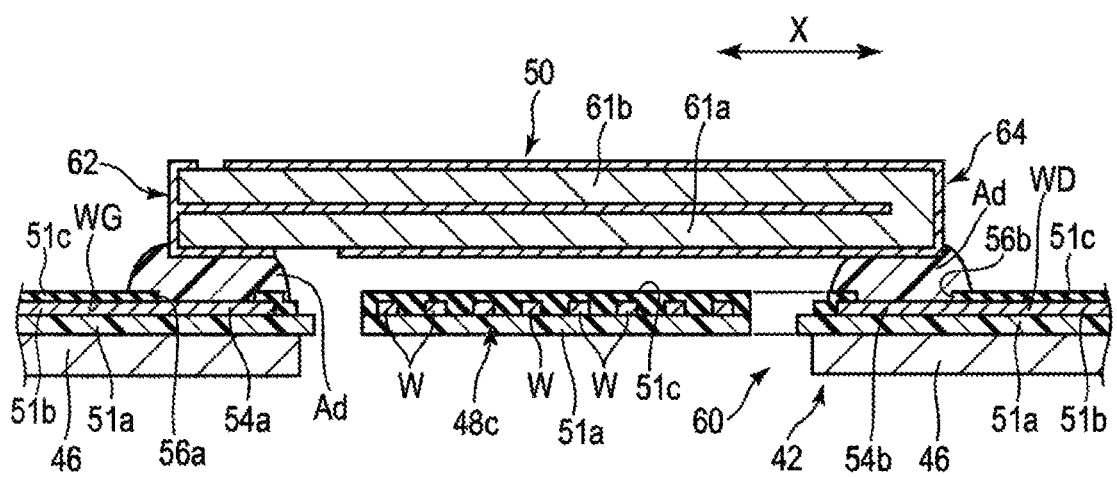
FIG. 6 is a sectional view of the piezoelectric element and the flexure taken along the line B-B of FIG. 5.

FIG. 5 is a plan view of a mounting portion 60 on which the piezoelectric element 50 is mounted and FIG. 6 is a sectional view of the mounting portion 60 and the piezoelectric element 50 taken along the line B-B of FIG. 5.

As shown in FIGS. 5 and 6, the flexure 42 includes the metal thin plate (i.e., the metal plate) 46 that serves as a base and is made of stainless steel or the like and the band-like wiring substrate 48 connected to the metal plate 46, and is formed as a long and narrow stacked plate. The wiring substrate 48 includes a base insulating layer (i.e., a first insulating layer) 51a, most of which is fixed to the metal plate 46, a conductive layer (a wiring pattern) 51b that is formed on the base insulating layer 51a and forms the plurality of signal traces W, the driving trace WD, the ground trace WG, the plurality of connecting pads, and the plurality of connecting terminals, and a cover insulating layer (a second insulating layer) 51c that is stacked on the base insulating layer 51a and covers the conductive layer 51b. Copper foil, for example, may be used as the conductive layer 51b.

The mounting portion 60 includes a first connecting pad 54a and a second connecting pad 54b, each being formed of the conductive layer 51b. In the present embodiment, one of the first and second connecting pads 54a and 54b, for example, the first connecting pad 54a functions as a ground pad. The first connecting pad 54a electrically connects to the ground trace WG formed of the conductive layer 51b. The second connecting pad 54b electrically connects to the driving trace WD that is also formed of the conductive layer 51b.

The first connecting pad 54a and the second connecting pad 54b are arranged side by side with a predetermined space left therebetween in a direction parallel to the central axis line Cl of the suspension 34. In the present embodiment, the bridge portion 48c of the flexure 42 is cut between the first connecting pad 54a and the second connecting pad 54b. As a result, the first connecting pad 54a and the second connecting pad 54b are arranged with a space of a predetermined length placed therebetween.

Openings 56a and 56b are provided in the cover insulating layer 51c in a position overlapping with the first connecting pad 54a and a position overlapping with the second connecting pad 54b, respectively. A portion of the first connecting pad 54a and a portion of the second connecting pad 54b are exposed at the outer surface of the cover insulating layer 51c through the openings 56a and 56b, respectively. In certain implementations, a substantial portion of the first connecting pad 54a and a substantial portion of the second connecting pad 54b are exposed at the outer surface of the cover insulating layer 51c through the openings 56a and 56b, respectively.

As shown in FIGS. 5 and 6, in one example, the piezoelectric element 50 includes a first piezoelectric substrate 61a and a second piezoelectric substrate 61b, each being formed of a piezoelectric material into the shape of a flat rectangular parallelepiped, and a first electrode 62 and a second electrode 64 for applying a voltage to the first and second piezoelectric substrates 61a and 61b. As the piezoelectric material, lead zirconate titanate, ceramic or the like, for example, is used. In the present embodiment, the first electrode 62 constitutes a ground electrode.

Assume that a longitudinal direction of the piezoelectric element 50 is X and a width direction that is at right angles to X is Y. The piezoelectric element 50 is placed in such a way that the longitudinal direction X extends approximately parallel to the central axis line Cl of the suspension 34. The piezoelectric element 50 is placed in the mounting portion 60 in a state in which one end in the longitudinal direction X faces the first connecting pad 54a and the other end in the longitudinal direction X faces the second connecting pad 54b. The first electrode (i.e., the ground electrode) 62 is electrically and mechanically connected to the first connecting pad (i.e., the ground pad) 54a by a conductive adhesive material Ad. The second electrode 64 is electrically and mechanically connected to the second connecting pad 54b by the conductive adhesive material Ad.

As a result, the piezoelectric element 50 is mounted on the mounting portion 60 of the flexure 42 and connected to the ground trace WG and the driving trace WD via the first connecting pad 54a and the second connecting pad 54b. The first electrode 62 is connected to a ground via the first connecting pad 54a and the ground trace WG. A drive voltage is applied to the second electrode 64 via the driving trace WD and the second connecting pad 54b.

In the present embodiment, the bridge portion 48c of the wiring substrate 48 extends to the tip portion 48b, passing under the piezoelectric element 50. As shown in FIG. 3, the flexure 42 includes the first end 42c provided at the extension end of the base end-side portion 42b. The first end 42c is formed in the shape of a long and narrow rectangle. A plurality of, for example, 13 connecting terminals (connecting pads) 43 are provided at the first end 42c. These connecting terminals 43 are formed of the conductive layer 51b of the wiring substrate 48. Any one of the connecting terminals 43, for example, a connecting terminal 43a farthest from the magnetic head 17 is used as a ground terminal. The signal traces W, the driving traces WD, and the ground traces WG of the flexure 42 are connected to these connecting terminals 43. That is, the signal trace W extends throughout almost the entire length of the flexure 42 and one end of the signal trace W is electrically connected the connecting pad 54 and the other end is connected to the connecting terminal 43. The driving trace WD extends throughout almost the entire length of the flexure 42 and one end of the driving trace WD is connected to the second connecting pad 54b and the other end is connected to the connecting terminal 43. Likewise, the ground trace WG extends throughout almost the entire length of the flexure 42 and one end of the ground trace WG is electrically connected to the first connecting pad 54a and the other end is connected to the connecting terminal 43a.

FIG. 7 is a side view schematically showing a state in which the suspension assembly 30 is attached to the arm 32.

As shown in FIG. 7, the joint portion 74 of the board unit 21 is stuck on the installation surface of the actuator block 29 and secured to the actuator block 29 with the fastening screws 65. A plurality of connecting pad groups 78 are provided in the joint portion 74. Each connecting pad group 78 includes a plurality of, for example, 13 connecting pads. Each connecting pad group 78 is connected to the base portion 70 of the board unit 21 via an unillustrated trace and the head IC 59.

The suspension assembly 30 is attached to the arm 32 and extends from the arm 32. The flexure 42 of the suspension assembly 30 extends to the actuator block 29 along the arm 32. The first end 42c is placed in such a way as to overlap the connecting pad group 78 of the joint portion 74, and the plurality of connecting terminals 43 are soldered to the corresponding connecting pads of the connecting pad group 78. As a result, the magnetic head 17 and the piezoelectric elements 50 of the suspension assembly 30 are connected to the connecting pad group 78 of the joint portion 74 via the connecting pads, the traces, and the connecting terminals of the flexure 42 and electrically connected to the base portion 70 of the board unit 21 via the head IC 59 and the traces. It is to be noted that, of the connecting pads of the connecting pad group 78, a connecting pad to which the ground terminal is joined may be ground-connected to the actuator block 29 via an unillustrated trace and the fastening screw 65.

In the HDD structured as described above, at the time of an unloading/loading operation of the magnetic head 17, the lift tab 40 of the suspension assembly 30 slides on a guide surface provided in the ramp of the ramp loading mechanism 25. Sliding of the lift tab 40 sometimes causes static electricity (ESD) to be generated in the lift tab 40. As indicated by arrows in FIG. 7, the generated static electricity is transmitted from the lift tab 40 to the actuator block 29 through the load beam 38, the base plate 36, and the arm 32 and is then applied to the piezoelectric element 50 through the fastening screw 65, the connecting pads of the connecting pad group 78, and the conductive layer (the connecting terminal 43a, the ground trace WG, and the first connecting pad 54a) of the flexure 42.

Figure 8:
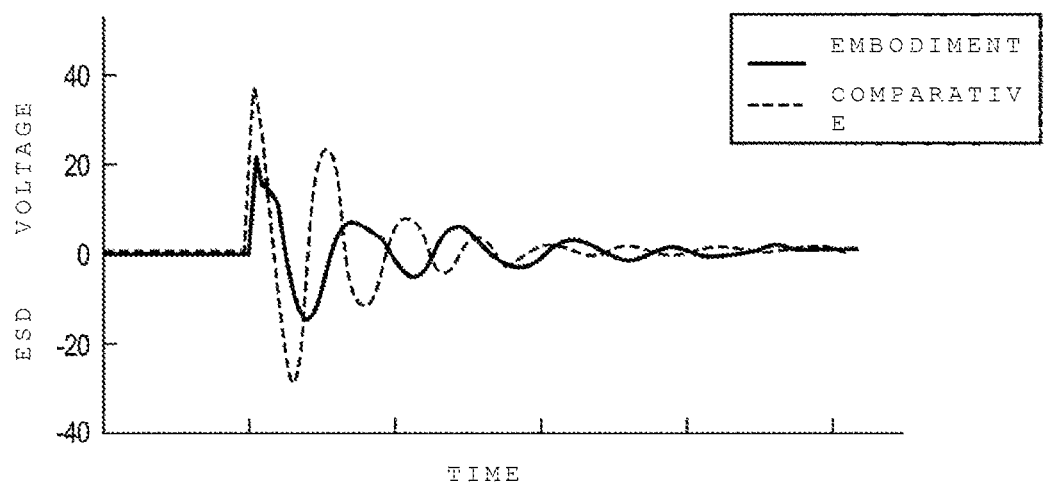
FIG. 8 is a diagram showing the relationship between an ESD voltage acting on the piezoelectric element and the time.

FIG. 8 is a diagram showing the relationship between a static electricity (ESD) voltage that is applied to a piezoelectric element and the time in the actuator assembly according to the present embodiment and an actuator assembly according to a comparative example. In the actuator assembly according to the comparative example, the ground electrode of the piezoelectric element electrically connects directly to the metal plate of the flexure and the load beam.

As shown in FIG. 8, in the actuator assembly of the comparative example, the edge face distance of the static electricity is short and a large ESD voltage is applied to the piezoelectric element. By contrast, it is clear that, in the actuator assembly according to the present embodiment, since the edge face distance of the static electricity is sufficiently long, an ESD voltage that is applied to the piezoelectric element 50 is greatly reduced as compared to the comparative example.

In the HDD and the suspension assembly which are structured as described above, the ground electrode of the piezoelectric element 50 mounted on the suspension assembly 30 is electrically connected to the connecting pad of the joint portion 74 via the conductive layer 51b (the first connecting pad 54a, the ground trace WG, and the connecting terminal 43a) of the flexure 42. This makes it possible to make sufficiently long the edge face distance of static electricity generated in the lift tab 40 to the piezoelectric element 50 and thereby greatly reduce an electrostatic voltage that is applied to the piezoelectric element 50.

As a result, according to the present embodiment, it is possible to reduce the adverse effect of static electricity on a piezoelectric element and obtain a suspension assembly and an HDD with improved reliability.

Next, a suspension assembly of an HDD according to another embodiment will be described. In the other embodiment which will be described below, the same portion as that of the above-described first embodiment is denoted by the same reference sign and a detailed explanation thereof is omitted or simplified, and a difference from the first embodiment is mainly described.

Second Embodiment

Figure 9:
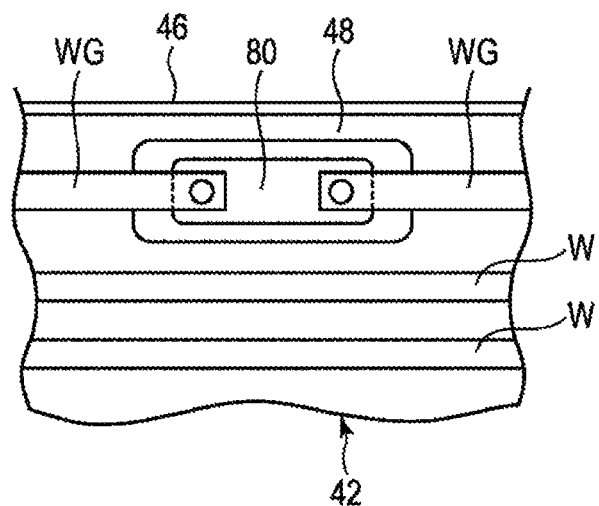
FIG. 9 is a plan view showing a part of a flexure of a suspension assembly according to a second embodiment.

FIG. 9 is a plan view schematically showing a part of a flexure in a suspension assembly according to a second embodiment.

As shown in FIG. 9, according to the second embodiment, a ground trace WG of the wiring substrate 48 of the flexure 42 is cut at a midway point into two parts: a first part and a second part. The two ground traces WG obtained by the cutting face each other with a gap left therebetween. An isolated and raised junction conductor 80 is provided in a position facing the gap. In the present embodiment, the junction conductor 80 is a metal plate 80 formed by cutting a part of the base metal plate 46 of the flexure 42 in the shape of an island and is electrically separated from the metal plate 46 surrounding the junction conductor 80. The cutting-side ends of the two ground traces WG are joined to the junction conductor 80. This allows the two ground traces WG to electrically connect to each other via the junction conductor 80. The junction conductor 80 is formed of a material whose electrical resistance is higher than the electrical resistance of the material of which the ground trace WG is formed, for example, copper, and the junction conductor 80 is formed of stainless steel, for example.

In one example, the cut portion of the ground trace WG and the junction conductor 80 are provided in a region AR (see FIG. 3), which is located between the arm 32 and the base plate 36, of a base end-side portion 42b of the flexure 42.

As described above, by placing the junction conductor 80 having high electrical resistance in a part of the ground trace WG, it is possible to further reduce an electrostatic voltage acting on a piezoelectric element.

In the second embodiment, the rest of the structure of the suspension assembly and the HDD is identical to the structure of the above-described first embodiment.

Third Embodiment

Figure 10:
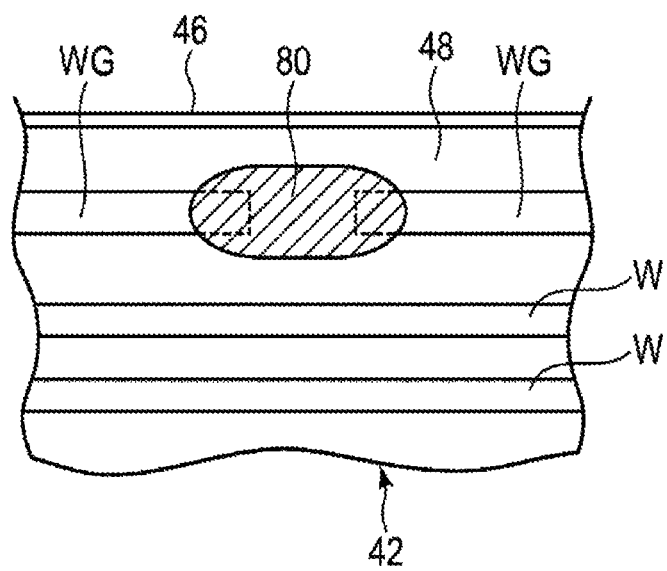
FIG. 10 is a plan view showing a part of a flexure of a suspension assembly according to a third embodiment.

FIG. 10 is a plan view schematically showing a part of a flexure in a suspension assembly according to a third embodiment.

As shown in FIG. 10, according to the third embodiment, the ground trace WG of the wiring substrate 48 of the flexure 42 is cut at a midway point into two parts: a first part and a second part. The junction conductor 80 is provided in such a way as to overlap the cutting-side ends of the two ground traces WG. This allows the two ground traces WG to electrically connect to each other via the junction conductor 80. According to the present embodiment, the junction conductor 80 is formed of a material whose electrical resistance is higher than the electrical resistance of the material of which the ground trace WG is formed; for example, the junction conductor 80 is formed of conductive paste such as silver paste.

In the third embodiment, the rest of the structure of the suspension assembly and the HDD is identical to the structure of the above-described first and second embodiments.

As described above, also in the third embodiment, by placing the junction conductor 80 having high electrical resistance in a part of the ground trace WG, it is possible to further reduce an electrostatic voltage acting on a piezoelectric element.

The present disclosure is not limited to the above-described embodiments in their original form and may be embodied with an element modified in the implementation stage without departing from the spirit of the present disclosure. Moreover, various embodiments can be achieved by appropriately combining the elements disclosed in the embodiments described above. For example, some of all the elements described in the embodiment may be eliminated. Furthermore, elements in different embodiments may be combined as appropriate.

For example, the materials for elements constituting the suspension assembly and the shapes, sizes and so forth of these elements are not limited to those of the above-described embodiments and may be changed in various ways when necessary. The number of piezoelectric elements is not limited to two (that is, a pair of piezoelectric elements); the number of piezoelectric elements may be one or three or more.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A flexure for use in a suspension assembly, the flexure comprising:
   a metal plate; and
   a wiring substrate connected to the metal plate, the wiring substrate comprising:
      an insulating layer abutting the metal plate,
      a conductive layer disposed on the insulating layer, the conductive layer comprising a ground pad,
      a piezoelectric element, the piezoelectric element comprising a ground electrode, and
      a first end comprising a plurality of connecting terminals;
      wherein the ground electrode is connected to the ground pad, wherein one of the plurality of connecting terminals is a ground terminal, wherein the conductive layer further comprises a ground trace that connects the ground terminal and the ground pad, and wherein the piezoelectric element and the ground trace are electrically isolated from the metal plate by the insulating layer configured not to allow an additional electrical connection between the ground electrode and the ground terminal, reducing an occurrence of static electricity on the piezoelectric element.

2. The flexure of claim 1, wherein the ground electrode is connected to the ground pad via an adhesive material.

3. The flexure according to claim 1,
   wherein the ground terminal is a connecting terminal of the plurality of connecting terminals that is located farthest from a head of the flexure.

4. A disk device comprising:
   a disk-shaped recording medium having a recording layer; and
   a head actuator including the flexure according to claim 1.

5. The disk device according to claim 4,
   wherein the head actuator includes a pivotally supported actuator block, a plurality of arms extending from the pivotally supported actuator block, and a suspension assembly attached to at least one of the plurality of arms,
   wherein the disk device further comprises a board unit that includes a joint portion attached to the pivotally supported actuator block, and
   wherein the joint portion includes a plurality of connecting pads, the plurality of connecting pads being connected to the plurality of connecting terminals provided at the first end of the flexure.

6. A flexure for use in a suspension assembly, the flexure comprising:
   a metal plate; and
   a wiring substrate connected to the metal plate, the wiring substrate comprising:
      an insulating layer abutting the metal plate,
      a conductive layer disposed on the insulating layer, the conductive layer comprising a ground pad,
      a piezoelectric element, the piezoelectric element comprising a ground electrode, and
      a first end comprising a plurality of connecting terminals;
   wherein the ground electrode is connected to the ground pad, wherein one of the plurality of connecting terminals is a ground terminal, wherein the conductive layer further comprises a ground trace that connects the ground terminal and the ground pad, and
   wherein the ground trace is cut into a first part and a second part, and wherein the first part and the second part electrically connect to each other via a junction conductor formed of a material whose electrical resistance is higher than an electrical resistance of the ground trace.

7. The flexure according to claim 6,
   wherein the junction conductor is integrally formed with a part of the metal plate.

8. The flexure according to claim 6,
   wherein the junction conductor comprises conductive paste provided on the wiring substrate.

* * * * *